(12) United States Patent
Schroeer et al.

(10) Patent No.: US 8,695,922 B2
(45) Date of Patent: Apr. 15, 2014

(54) AIRCRAFT FUSELAGE STRUCTURE AND METHOD FOR ITS PRODUCTION

(75) Inventors: Thorsten Schroeer, Luebeck (DE); Thorsten Roming, Himmelpforten (DE)

(73) Assignee: Airbus Operations GmbH, Hamburg (DE)

( * ) Notice: Subject to any disclaimer, the term of this patent is extended or adjusted under 35 U.S.C. 154(b) by 495 days.

(21) Appl. No.: 12/308,004

(22) PCT Filed: Jun. 6, 2007

(86) PCT No.: PCT/EP2007/055556
§ 371 (c)(1),
(2), (4) Date: May 14, 2009

(87) PCT Pub. No.: WO2007/141291
PCT Pub. Date: Dec. 13, 2007

(65) Prior Publication Data
US 2009/0321569 A1     Dec. 31, 2009

(30) Foreign Application Priority Data
Jun. 6, 2006   (DE) .......................... 10 2006 026 168

(51) Int. Cl.
*B64C 1/06*    (2006.01)
(52) U.S. Cl.
USPC .................. 244/119; 244/117 R; 244/120
(58) Field of Classification Search
USPC ........ 244/119, 120, 117 R, 123.3, 123.4, 124
See application file for complete search history.

(56) References Cited

U.S. PATENT DOCUMENTS

| | | | | |
|---|---|---|---|---|
| 1,355,741 | A | * 10/1920 | Gilmore et al. | 244/119 |
| 1,393,488 | A | * 10/1921 | Black | 244/119 |
| 1,874,610 | A | *  8/1932 | Payne | 244/117 R |
| 1,885,406 | A | * 11/1932 | Bechereau | 29/462 |
| 1,963,416 | A | 6/1934 | Minshall | |
| 2,134,260 | A | 10/1938 | Nickerson | |
| 2,259,624 | A | * 10/1941 | Dornier | 244/119 |

(Continued)

FOREIGN PATENT DOCUMENTS

| | | |
|---|---|---|
| DE | 4019744 | 1/1992 |
| DE | 10145272 | 4/2003 |

(Continued)

OTHER PUBLICATIONS

International Search Report and Notification of Transmittal dated Sep. 3, 2007.

(Continued)

*Primary Examiner* — Timothy D Collins
*Assistant Examiner* — Nicholas McFall
(74) *Attorney, Agent, or Firm* — Jenkins, Wilson, Taylor & Hunt, P.A.

(57) ABSTRACT

An aircraft fuselage structure with frames (11) running transversely with respect to the longitudinal direction of the fuselage, and main deck cross members (14) is disclosed. The aircraft fuselage structure contains premanufactured integral units (10) which each comprise at least the lower region of the fuselage frame (11) and the main deck cross member (14), the fuselage frame (11) and a region (14a) of the main deck cross member (14) that spans at least an essential part of the width of the main deck and merges on both sides into the fuselage frame (11) being premanufactured in the form of an integral component.

18 Claims, 3 Drawing Sheets

(56) References Cited

U.S. PATENT DOCUMENTS

| | | | |
|---|---|---|---|
| 2,263,365 A * | 11/1941 | Nicolaus et al. | 244/59 |
| 2,372,905 A * | 4/1945 | McKinnie | 244/54 |
| 2,407,480 A * | 9/1946 | Dean | 244/119 |
| 2,500,015 A * | 3/1950 | Tweney et al. | 244/119 |
| 2,778,586 A * | 1/1957 | Nyerges et al. | 244/120 |
| 2,925,050 A * | 2/1960 | Candlin, Jr. et al. | 105/397 |
| 3,023,860 A | 3/1962 | Ellzey | |
| 3,155,348 A | 11/1964 | Ricard | |
| 3,405,893 A * | 10/1968 | Rajau et al. | 244/119 |
| 3,677,502 A | 7/1972 | Tupolev et al. | |
| 3,955,781 A | 5/1976 | Tupolev et al. | |
| 4,310,132 A | 1/1982 | Frosch et al. | |
| 4,479,621 A * | 10/1984 | Bergholz | 244/117 R |
| 4,622,517 A | 11/1986 | Arnaud et al. | |
| 4,646,993 A * | 3/1987 | Baetke | 244/117 R |
| 5,024,399 A | 6/1991 | Barquet et al. | |
| 5,201,831 A | 4/1993 | Higgins et al. | |
| 5,223,067 A | 6/1993 | Hamamoto et al. | |
| 5,242,523 A | 9/1993 | Willden et al. | |
| 5,251,849 A | 10/1993 | Torres | |
| 5,429,326 A | 7/1995 | Garesche et al. | |
| 5,496,000 A * | 3/1996 | Mueller | 244/118.1 |
| 5,542,626 A | 8/1996 | Beuck et al. | |
| 5,577,688 A * | 11/1996 | Sloan | 244/117 R |
| 5,586,391 A | 12/1996 | Micale | |
| 5,752,673 A * | 5/1998 | Schliwa et al. | 244/118.6 |
| 5,779,193 A * | 7/1998 | Sloan | 244/117 R |
| 5,806,797 A | 9/1998 | Micale | |
| 5,897,079 A * | 4/1999 | Specht et al. | 244/118.5 |
| 5,975,183 A | 11/1999 | Reis et al. | |
| 6,114,050 A | 9/2000 | Westre et al. | |
| 6,158,690 A | 12/2000 | Wadey | |
| 6,182,926 B1 * | 2/2001 | Moore | 244/118.5 |
| 6,364,250 B1 | 4/2002 | Brinck et al. | |
| 6,415,510 B2 | 7/2002 | Mertens et al. | |
| 6,435,242 B1 | 8/2002 | Reis et al. | |
| 6,510,961 B1 | 1/2003 | Head et al. | |
| 6,511,570 B2 | 1/2003 | Matsui | |
| 6,595,467 B2 | 7/2003 | Schmidt | |
| 6,613,258 B1 | 9/2003 | Maison et al. | |
| 6,772,977 B2 * | 8/2004 | Dees et al. | 244/118.1 |
| 7,025,305 B2 | 4/2006 | Folkesson et al. | |
| 7,087,317 B2 | 8/2006 | Ehrstrom et al. | |
| 7,108,227 B2 * | 9/2006 | Kunzel et al. | 244/119 |
| 7,124,982 B2 | 10/2006 | Brofeldt | |
| 7,134,629 B2 | 11/2006 | Johnson et al. | |
| 7,159,822 B2 | 1/2007 | Grantham et al. | |
| 7,410,352 B2 | 8/2008 | Sarh | |
| 7,445,180 B2 * | 11/2008 | Plude et al. | 244/118.1 |
| 7,459,048 B2 | 12/2008 | Pham et al. | |
| 7,461,816 B2 * | 12/2008 | Schwartz et al. | 244/117 R |
| 7,503,368 B2 | 3/2009 | Chapman et al. | |
| 7,527,222 B2 | 5/2009 | Biornstad et al. | |
| 7,621,482 B2 * | 11/2009 | Sankrithi et al. | 244/119 |
| 7,686,249 B2 | 3/2010 | Luttig et al. | |
| 7,716,835 B2 | 5/2010 | Johnson et al. | |
| 7,857,258 B2 | 12/2010 | Normand et al. | |
| 7,866,440 B2 | 1/2011 | Douglas | |
| 7,874,516 B2 | 1/2011 | Cacciaguerra | |
| 8,534,605 B2 | 9/2013 | Haack | |
| 2002/0153454 A1 | 10/2002 | Seidel | |
| 2004/0195452 A1 | 10/2004 | Brofeldt | |
| 2005/0037188 A1 | 2/2005 | Ehrstrom et al. | |
| 2005/0236523 A1 | 10/2005 | Schwartz et al. | |
| 2005/0263645 A1 | 12/2005 | Johnson et al. | |
| 2006/0060705 A1 | 3/2006 | Stulc et al. | |
| 2006/0071125 A1 | 4/2006 | Wood et al. | |
| 2006/0108058 A1 | 5/2006 | Chapman et al. | |
| 2006/0192051 A1 | 8/2006 | Novak et al. | |
| 2006/0226287 A1 | 10/2006 | Grantham et al. | |
| 2006/0231682 A1 | 10/2006 | Sarh | |
| 2006/0237587 A1 | 10/2006 | Luttig et al. | |
| 2007/0176048 A1 | 8/2007 | Huber et al. | |
| 2007/0210211 A1 | 9/2007 | Grob | |
| 2008/0093503 A1 | 4/2008 | Cacciaguerra | |
| 2008/0105785 A1 | 5/2008 | Griess et al. | |
| 2008/0149768 A1 | 6/2008 | Sarh | |
| 2008/0156935 A1 | 7/2008 | Alby et al. | |
| 2008/0179460 A1 | 7/2008 | Rodriguez et al. | |
| 2008/0210820 A1 * | 9/2008 | Kismarton et al. | 244/120 |
| 2008/0223985 A1 * | 9/2008 | Marsh et al. | 244/119 |
| 2008/0230652 A1 * | 9/2008 | Biornstad et al. | 244/120 |
| 2008/0237442 A1 | 10/2008 | Sarh | |
| 2008/0246175 A1 | 10/2008 | Biornstad et al. | |
| 2008/0258007 A1 | 10/2008 | Guard et al. | |
| 2009/0020645 A1 | 1/2009 | Cacciaguerra | |
| 2009/0039208 A1 | 2/2009 | Raeckers | |
| 2009/0101756 A1 | 4/2009 | Cacciaguerra | |
| 2009/0139641 A1 | 6/2009 | Chapman et al. | |
| 2009/0217529 A1 | 9/2009 | Cerezo et al. | |
| 2009/0250554 A1 * | 10/2009 | Graeber et al. | 244/120 |
| 2009/0294588 A1 | 12/2009 | Griess et al. | |
| 2009/0314891 A1 | 12/2009 | Haack | |
| 2010/0025531 A1 * | 2/2010 | Pahl | 244/120 |
| 2010/0025532 A1 | 2/2010 | Herrmann et al. | |
| 2010/0044510 A1 * | 2/2010 | Schroeer et al. | 244/119 |
| 2010/0133380 A1 | 6/2010 | Roebroeks et al. | |
| 2010/0133382 A1 | 6/2010 | Pahl | |
| 2010/0155532 A1 | 6/2010 | Ariza Martin et al. | |
| 2010/0181426 A1 | 7/2010 | Haack | |
| 2010/0213315 A1 | 8/2010 | Marpinard | |
| 2010/0219294 A1 | 9/2010 | Kismarton | |
| 2010/0308165 A1 | 12/2010 | Markowski et al. | |
| 2010/0327113 A1 | 12/2010 | Marquez Lopez et al. | |
| 2011/0006159 A1 | 1/2011 | Herrmann et al. | |
| 2011/0011978 A1 * | 1/2011 | Haack et al. | 244/119 |
| 2011/0056066 A1 | 3/2011 | Alvez | |
| 2011/0073708 A1 | 3/2011 | Biornstad et al. | |

FOREIGN PATENT DOCUMENTS

| | | |
|---|---|---|
| DE | 10145276 | 7/2003 |
| DE | 10314039 | 10/2004 |
| DE | 102004056286 | 5/2006 |
| DE | 102005023886 | 12/2006 |
| EP | 1149687 | 10/2001 |
| EP | 1731419 | 12/2006 |
| ES | 2112711 | 4/1998 |
| FR | 1345076 | 12/1963 |
| FR | 958 883 | 5/1964 |
| FR | 2766407 | 1/1999 |
| GB | 159 351 | 3/1921 |
| GB | 2196922 | 5/1988 |
| JP | 59-176669 | 10/1984 |
| JP | 06-298186 | 10/1994 |
| JP | 2001-310798 | 11/2001 |
| JP | 2008-519730 | 6/2008 |
| RU | 2244660 | 1/2005 |
| RU | 2270135 | 2/2006 |
| RU | 2271304 | 3/2006 |
| RU | 2435703 | 7/2010 |
| WO | WO 96/10477 | 4/1996 |
| WO | WO 2005012085 | 2/2005 |
| WO | WO 2005084152 | 9/2005 |
| WO | WO 2005/121627 | 12/2005 |
| WO | WO 2006001859 | 1/2006 |
| WO | WO 2006051235 | 5/2006 |
| WO | WO2007141251 A2 | 12/2007 |
| WO | WO2007141268 A1 | 12/2007 |
| WO | WO 2007141291 | 12/2007 |

OTHER PUBLICATIONS

German Office Action dated Oct. 30, 2007.
German Office Action dated Sep. 25, 2007 corresponding to German Patent Application No. 10 2006 026 169.0-22.
German Office Action dated Sep. 25, 2007 corresponding to German Patent Application No. 10 2006 026 170.4-22.
Notification of Transmittal of The International Search Report and the Written Opinion of the International Searching Authority, or the Declaration for International Application No. PCT/EP2007/055519 (Oct. 22, 2007).
Notification of Transmittal of The International Search Report and

(56) References Cited

OTHER PUBLICATIONS the Written Opinion of the International Searching Authority, or the Declaration for International Application No. PCT/EP2007/055494 (Nov. 13, 2008).
Final Office Action for U.S. Appl. No. 12/227,669 dated Nov. 21, 2011.
Non-final Office Action for U.S. Appl. No. 12/227,669 dated Feb. 28, 2012.
Non-final Office Action for U.S. Appl. No. 12/227,669 dated Jun. 21, 2011.
Non-final Office Action for U.S. Appl. No. 12/308,029 dated Sep. 15, 2011.
Final Office Action for U.S. Appl. No. 12/227,669 dated Aug. 2, 2012.
Non-final Office Action for U.S. Appl. No. 12/308,029 dated May 16, 2012.
Non-Final Office Action for U.S. Appl. No. 12/227,669 dated Nov. 15, 2012.
Japanese Office Action for Appl. No. 2009-513670 dated Apr. 27, 2012.
Non-Final Office Action for U.S. Appl. No. 12/308,029 dated Nov. 5, 2012.
Russian Notice of Grant for Appl. No. 2008-149092-11 dated Jun. 1, 2011.
Chinese Office Action for CN 200780018303.4 dated Mar. 18, 2013.
Notice of Allowance for U.S. Appl. No. 12/227,669 dated May 15, 2013.
Notice of Allowance for U.S. Appl. No. 12/308,029 dated Jun. 14, 2013.
Russian Notice of Grant for Appl. No. 2008-151379-11 dated Jun. 1, 2011.
Chinese Office Action for Application No. 200780015659.2 dated Jul. 14, 2010.
Notice of Allowance for U.S. Appl. No. 12/308,029 dated Oct. 17, 2013.

\* cited by examiner

AIRCRAFT FUSELAGE STRUCTURE AND METHOD FOR ITS PRODUCTION

FIELD OF THE INVENTION

The invention relates to an aircraft fuselage structure with frames running transversely with respect to the longitudinal direction of the fuselage, and main deck cross members. Furthermore, the invention relates to an integral unit for an aircraft fuselage structure of this type, and to a method for the production of the same.

BACKGROUND OF THE INVENTION

Pressurized fuselages of commercial aircraft are typically assembled nowadays from sections which are each constructed from a plurality of shells in which a skin, stringers and frames are connected to one another. Cross members for the hold, main deck and hat rack are subsequently riveted to the frames, and supporting rods are fitted between cross member and frame and bolted to corresponding joining fittings which are riveted on.

SUMMARY OF THE INVENTION

The invention provides an aircraft fuselage structure which is weight-saving and can be constructed with relatively low costs and from few individual parts.

An aircraft fuselage structure with the features of claim 1 is provided.

Furthermore, the invention provides an integral unit for an aircraft fuselage structure of this type with the features of claim 22, and a method for the production of an aircraft fuselage structure with the features of claim 39.

The invention provides an aircraft fuselage structure with frames running transversely with respect to the longitudinal direction of the fuselage, and main deck cross members. According to the invention, it is provided that the aircraft fuselage structure contains premanufactured integral units which each comprise at least the lower region of the fuselage frame and the main deck cross member, the fuselage frame and a region of the main deck cross member that spans at least an essential part of the width of the main deck and merges on both sides into the fuselage frame being premanufactured in the form of an integral component.

Furthermore, the invention provides an integral unit for an aircraft fuselage structure with frames running transversely with respect to the longitudinal direction of the fuselage, and main deck cross members, and a skin shell arranged on the frames. According to the invention, the integral unit comprises at least the lower region of the fuselage frame and the main deck cross member, the fuselage frame and a region of the main deck cross member that spans at least a substantial part of the width of the main deck and merges on both sides into the fuselage frame being premanufactured in the form of an integral component.

Finally, the invention provides a method for the production of an aircraft fuselage structure with frames running transversely with respect to the longitudinal direction of the fuselage, and main deck cross members. According to the invention, premanufactured integral units are produced which each comprise at least the lower region of the fuselage frame and the main deck cross member, the fuselage frame and a region of the main deck cross member that spans at least a substantial part of the width of the main deck and merges on both sides into the fuselage frame being premanufactured in the form of an integral component, the integral units are arranged on an installation apparatus and are adjusted, and the integral units are joined together by means of longitudinal members.

Advantageous embodiments and developments of the aircraft fuselage structure, integral unit and method for its production are provided in the particular subclaims.

BRIEF DESCRIPTION OF THE FIGURES

Exemplary embodiments of the invention are explained below with reference to the drawing, in which.

DETAILED DESCRIPTION OF THE INVENTION

Figure 1:
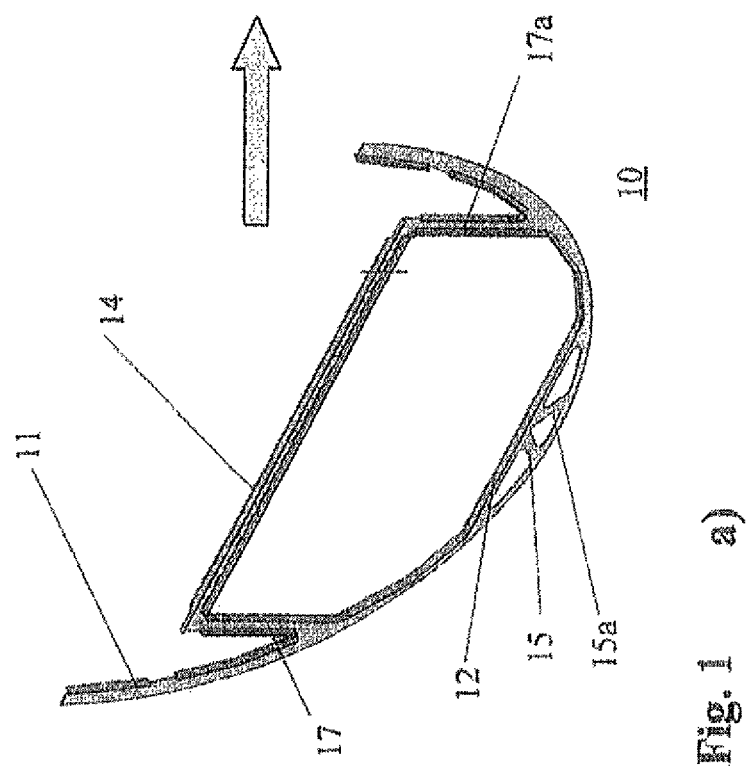
FIG. 1a) and b) show a perspective view of an integral unit which is provided for the production of an aircraft fuselage structure according to an exemplary embodiment of the invention (FIG. 1a)), and respectively, of an aircraft fuselage structure produced in the form of an aircraft fuselage segment from a number of integral units of this type, according to an exemplary embodiment of the invention (FIG. 1b))
Figure 1:
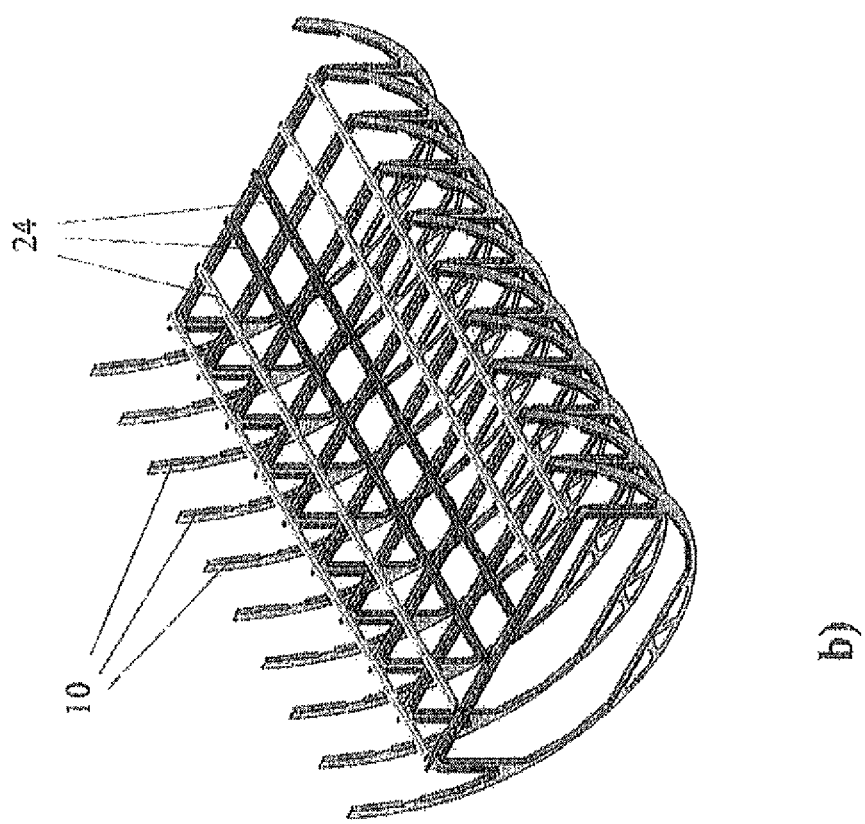

FIG. 1a) shows, in a perspective view, an integral unit 10 which, in the exemplary embodiment illustrated, is used for the production of an aircraft fuselage structure which is to contain frames running transversely with respect to the longitudinal direction of the aircraft fuselage or in the circumferential direction, stringers running in the longitudinal direction and a skin which is arranged thereon and is intended for the compression-proof sealing of the vehicle fuselage to the outside.

The integral unit 10 contains a frame 11, a main cross member 14 and a hold cross member 12. The hold cross member 12 is supported against the frame 11 by respective supporting elements 15, 15a, and the main deck cross member 14 is supported against the frame 11 by respective supporting elements 17, 17a. The hold cross member 12 and the main deck cross member 14 and the supporting elements 15, 15a and 17, 17a thereof are designed as integral parts of the integral unit 10.

The integral units 10 of the exemplary embodiment described can be produced from fibre-reinforced plastic, in particular from carbon-fibre-reinforced plastic or else from metal. The integral units 10 can be produced from one piece or from a plurality of parts. The production of the integral units 10 can take place in one operation, with all of the components necessary being produced in one piece, i.e. integrally. The production can take place, in particular, in a negative mould in such a manner that tolerances which occur are in each case apportioned to the side which is unimportant for the installation, i.e. to the internal chord of the main body of the integral unit 10, which main body forms the frame, and to the lower side of the cross members 12 and 14. A single-piece formation of the integral unit in a weight-saving CFRP construction reduces the weight and increases the strength, and a large number of joining and connecting points between the respective elements is omitted.

In the exemplary embodiment illustrated in the figures, the integral units 10 each comprise the lower region of the fuselage frame 11, the hold cross member 12 and the main deck cross member 14, the fuselage frame 11, the hold cross member 12 and a region 14a (see FIG. 4) of the main deck cross member 14 that spans a substantial part of the width of the main deck and merges on both sides into the fuselage frame 11 being premanufactured in the form of an integral component. Alternatively, the main deck cross member 14 can reach over the entire width of the main deck and can merge on both sides into the fuselage frame 11. The main deck cross member 14 merges on both sides via the supporting elements 17, 17a, which run downwards from the main deck cross member 14, in the form of an integral component into the fuselage frame 11, the supporting elements 17, 17a being arranged offset laterally inwards from the fuselage frame 11, and that part of the main deck cross member 14 which is joined to the fuselage frame 11 via the supporting elements 17, 17a ending at the supporting elements 17, 17a with a free space located outside the supporting elements 17, 17a being left open. At its ends, the main deck cross member 14 is joined to the fuselage frame 11 by means of side parts or profiles 14b, 14c (see FIG. 4), which are produced separately and are inserted subsequently, with the free space located outside the supporting element 17, 17a being spanned.

FIG. 1b shows, perspectively, a carcass of an aircraft fuselage structure, which carcass is produced from a number of integral units 10 of this type and is in the form of an aircraft fuselage segment. The aircraft fuselage structure is assembled from a number of premanufactured integral units 10 and longitudinal members 24. For this purpose, the integral units 10 are arranged on an installation apparatus (manufacturing means) and adjusted, and the integral units 10 are connected by means of the longitudinal members 24.

Figure 2:
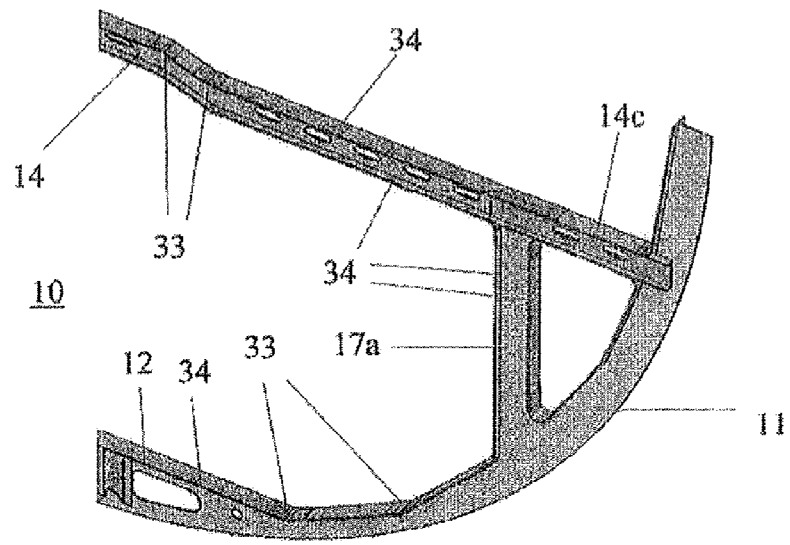
FIG. 2a) shows a perspective view of part of an integral unit for an aircraft fuselage structure according to an exemplary embodiment of the invention in order to explain details of the same.
FIG. 2b) shows a sectional view of part of an integral unit for an aircraft fuselage structure according to an exemplary embodiment of the invention in order to explain further details of the same.
Figure 2:
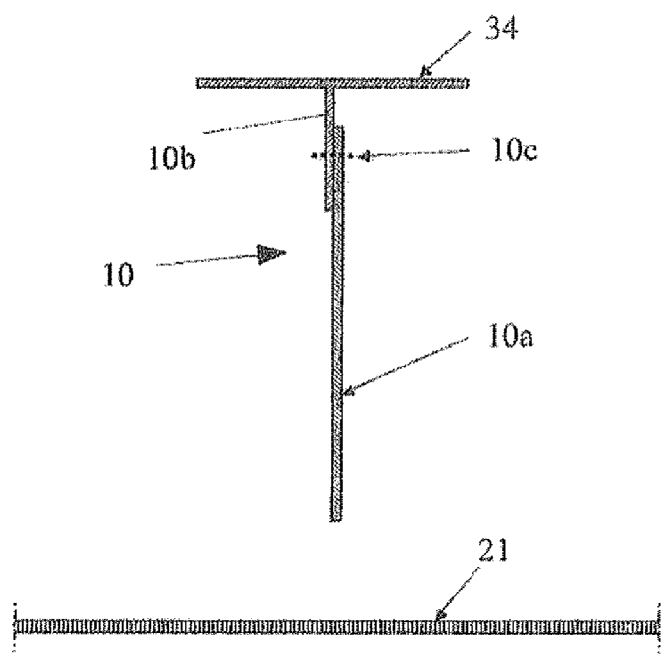

As FIGS. 2a) and 2b) show, in the exemplary embodiment shown here the integral units 10 are produced from web regions 10a situated in the plane of the integral unit 10 and chord regions 34 connected thereto, the web regions 10a being produced as a single piece with the chord regions 34. The chord regions 34 may also be produced as a separate part in the form of a T-profile and connected to the web regions 10a. The connection of the T-profile to the web region 10a can be produced by adhesive bonding or else by riveting. The integral units 10 can additionally be strengthened by local reinforcing means 33 provided at the chord regions 34.

Figure 3:
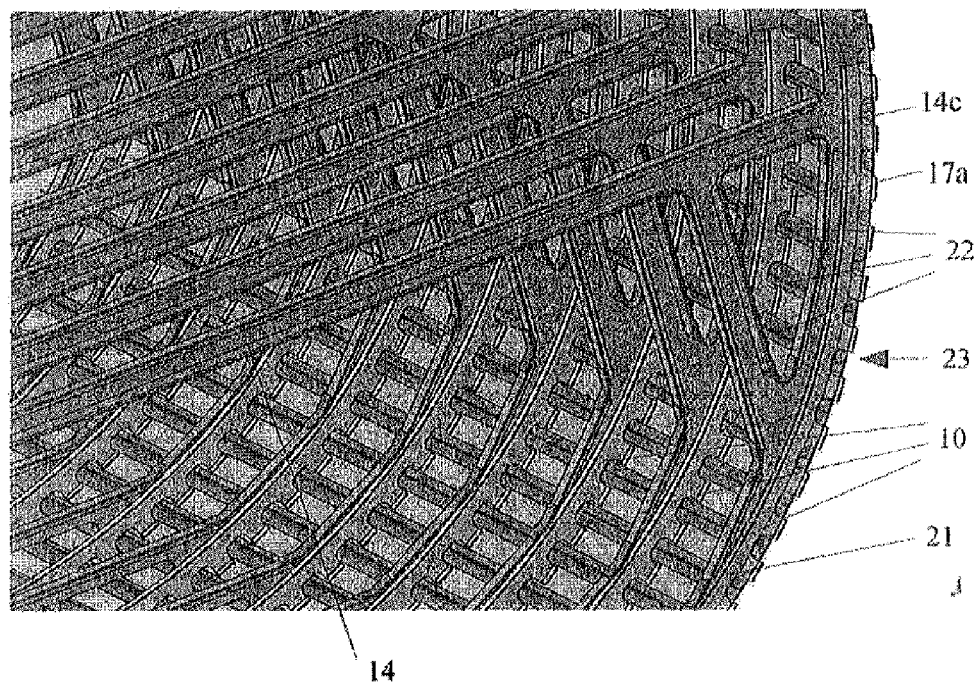
FIG. 3 shows a perspective view of an aircraft fuselage structure produced in the form of an aircraft fuselage segment from a number of integral units, according to an exemplary embodiment of the invention, with the skin fitted.

FIG. 3 shows, in a cut-out, a perspective view of an aircraft fuselage structure produced in the form of an aircraft fuselage segment from a number of integral units 10. The assembled integral units 10 are fitted into a premanufactured lower partial shell 23 of the aircraft fuselage, said partial shell comprising skin 21 and stringers 22. The integral units 10 are connected to the skin shell 23 by means of force-transmission combs provided thereon, and are bolted down or riveted.

Figure 4:
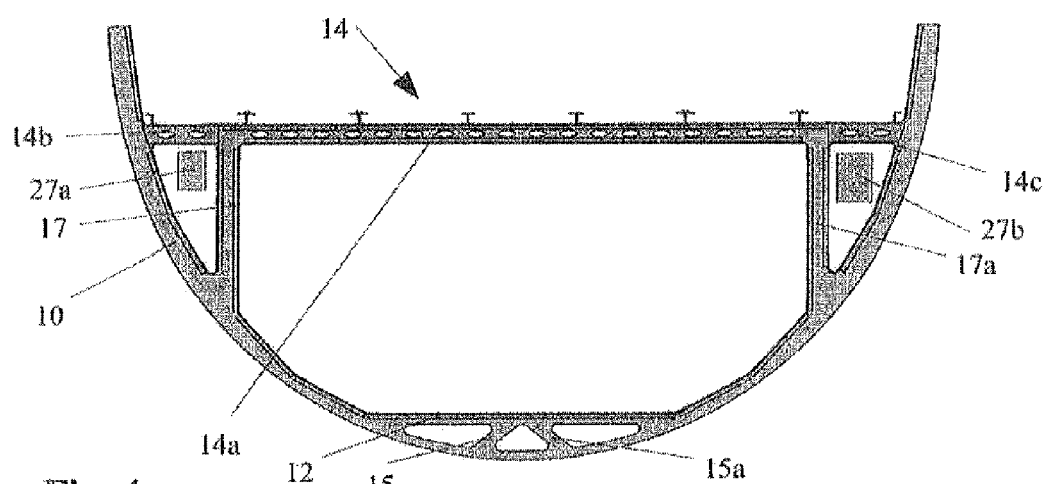
FIG. 4 shows a sectional illustration through an aircraft fuselage structure according to an exemplary embodiment of the invention, in which system lines which are pre-installed in a free space located laterally are inserted and system lines pre-installed to form panel elements are mounted below the main deck cross members.

As FIG. 4 shows, system lines 27a, 27b which are preinstalled in the free space located outside the supporting elements 17, 17a and run in the longitudinal direction of the aircraft fuselage may be installed.

In a preferred embodiment of the aircraft fuselage structure the integral units are fixed to the skin elements by means of connecting elements containing force-transmission combs.

In another preferred embodiment of the aircraft fuselage structure the integral units are produced from fibre-reinforced plastic.

In another preferred embodiment the integral units are produced from carbon-fibre-reinforced plastic.

In another preferred embodiment the integral units are produced from metal.

In another preferred embodiment the connection of the T-profile to the web region is produced by adhesive bonding.

In another preferred embodiment the connection of the T-profile to the web region is produced by riveting.

In another preferred embodiment the integral units are additionally strengthened by local reinforcing means provided on the chord regions.

In a preferred embodiment of the integral unit for an aircraft fuselage structure the integral unit contains connecting elements by means of which it can be fixed to the skin elements by means of force-transmission combs.

In another preferred embodiment of the integral unit for an aircraft fuselage structure the integral unit is produced from fibre-reinforced plastic.

In another preferred embodiment of the integral unit for an aircraft fuselage structure the integral unit is produced from carbon-fibre-reinforced plastic.

In another preferred embodiment of the integral unit for an aircraft fuselage structure the integral unit is produced from metal.

In another preferred embodiment of the integral unit for an aircraft fuselage structure the connection of the T-profile to the web region is produced by adhesive bonding.

In another preferred embodiment of the integral unit for an aircraft fuselage structure the connection of the T-profile to the web region is produced by riveting.

In another preferred embodiment of the integral unit for an aircraft fuselage structure the integral units are additionally strengthened by local reinforcing means provided on the chord regions.

In a preferred embodiment of the method for the production of an aircraft fuselage structure the integral units are fixed to the skin elements by means of connecting elements containing force-transmission combs.

In another preferred embodiment of the method for the production of an aircraft fuselage structure the integral units are produced from fibre-reinforced plastic.

In another preferred embodiment of the method for the production of an aircraft fuselage structure the integral units are produced from carbon-fibre-reinforced plastic.

In another preferred embodiment of the method for the production of an aircraft fuselage structure the integral units are produced from metal.

In another preferred embodiment of the method for the production of an aircraft fuselage structure the web region is produced by adhesive bonding.

In another preferred embodiment of the method for the production of an aircraft fuselage structure the connection of the T-profile to the web region is produced by riveting.

In another preferred embodiment of the method for the production of an aircraft fuselage structure the integral units are additionally strengthened by local reinforcing means provided on the chord regions.

LIST OF REFERENCE NUMERALS

10 Integral unit
10a Web
10b T-profile
10c Connection

11 Frame
12 Hold cross member
14 Main deck cross member
15, 15a Supporting element
17, 17a Supporting element
21 Skin
22 Stringer
23 Skin shell
24 Longitudinal member
27a, 27b System lines
33 Local reinforcing means
Chord

The invention claimed is:

1. An aircraft fuselage structure comprising:
a plurality of premanufactured integral units, each of which comprises at least a lower region of a fuselage frame that extends transversely with respect to a longitudinal direction of the aircraft fuselage structure, and a main deck cross member,
wherein the main deck cross member extends over a substantial part of a width of a main deck and merges on both sides into the fuselage frame via supporting elements, which run downwards from the main deck cross member,
wherein the supporting elements are arranged offset laterally inwards from the fuselage frame, and
wherein the fuselage frame and the main deck cross member that spans a substantial part of the width of the main deck are premanufactured in the form of an integral component before assembly of the aircraft fuselage structure,
wherein that part of the main deck cross member which merges via the supporting elements into the fuselage frame ends in a laterally outwards direction at the supporting elements, with a free space that extends from the supporting elements laterally outwards being left open.

2. The aircraft fuselage structure according to claim 1, wherein each of the plurality of premanufactured integral units further comprise a hold cross member which is premanufactured together with the fuselage frame and the main deck cross member in the form of an integral component before assembly of the aircraft fuselage structure.

3. The aircraft fuselage structure according to claim 1, wherein the main deck cross member is joined at its ends to the fuselage frame by side parts which are produced separately and are inserted subsequently, with the free space located outside the supporting elements being spanned.

4. The aircraft fuselage structure according to claim 2, wherein the aircraft fuselage structure is assembled from the plurality of premanufactured integral units, a plurality of skin elements which are connected thereto, and longitudinal members, wherein system lines that are pre-installed in the free space located outside the supporting elements are inserted, and wherein the plurality of premanufactured integral units are fitted into a premanufactured lower partial shell of the aircraft fuselage.

5. The aircraft fuselage structure according to claim 4, wherein the aircraft fuselage structure is assembled from fuselage sections, each of which comprises the plurality of premanufactured integral units.

6. The aircraft fuselage structure according to claim 5, wherein the plurality of premanufactured integral units are produced from web regions situated in the plane of the premanufactured integral unit and from chord regions connected thereto, and wherein the web regions are produced as a single piece with the chord regions, or wherein the chord regions are produced as a separate part in the form of a T-profile and are connected to the web regions.

7. The aircraft fuselage structure according to claim 1, wherein the integral units are produced as a single piece.

8. An integral unit for an aircraft fuselage structure comprising:
at least a lower region of a fuselage frame that is configured to extend transversely with respect to a longitudinal direction of the aircraft fuselage structure and a main deck cross member,
wherein a portion of the main deck cross member is configured to extend over a substantial part of a width of a main deck and merges on both sides into the fuselage frame via supporting elements, which run downwards from the main deck cross member,
wherein the supporting elements are arranged offset laterally inwards from the fuselage frame,
wherein the fuselage frame and the portion of main deck cross member that spans a substantial part of the width of the main deck are premanufactured in the form of an integral component before assembly of the aircraft fuselage structure, and
wherein that part of the main deck cross member that merges into the fuselage frame via the supporting elements ends or terminates in a laterally outwards direction at the supporting elements, whereby a free space in the laterally outwards direction from the supporting elements is left open.

9. The integral unit according to claim 8, wherein the integral unit further comprises a hold cross member which is premanufactured together with the fuselage frame and the main deck cross member in the form of an integral component before assembly of the aircraft fuselage structure, and wherein the main deck cross member is joined at its ends to the fuselage frame by side parts, which are produced separately and are inserted subsequently, such that the free space located laterally outwards of the supporting elements is spanned, and wherein the integral units are produced as a single piece or from a plurality of parts.

10. The integral unit according to claim 8, wherein the integral unit is produced from web regions situated in the plane of the integral unit and from chord regions connected thereto, and wherein the web regions are produced as a single piece with the chord regions, or wherein the chord regions are produced as a separate part in the form of a T-profile and are connected to the web regions.

11. The integral unit according to claim 8, wherein the integral unit is produced as a single piece.

12. A method for the production of an aircraft fuselage structure comprising:
producing a plurality of premanufactured integral units each of which comprises at least a lower region of a fuselage frame and a main deck cross member,
wherein a region of the main deck cross member in each of the plurality of premanufactured integral units extends over a substantial part of a width of a main deck of the fuselage structure and merges on both sides into the fuselage frame via supporting elements, which run downwards from the main deck cross member, wherein the supporting elements are arranged offset laterally inwards from the fuselage frame, and wherein the part of the main deck cross member that merges via the supporting elements ends or terminates in a laterally outwards direction at the supporting elements, with a free space in the laterally outwards direction from the supporting elements being left open, and wherein the fuselage frame and the region of the main deck cross member that spans at least a substantial part of the width of the main deck are premanufactured in the form of an integral component before being arranged on an installation apparatus, arranging and adjusting the plurality of premanufactured integral units on an installation apparatus, and joining the plurality of premanufactured integral units together by longitudinal members.

13. The method according to claim 12, wherein the plurality of premanufactured integral units are each produced with a hold cross member that is premanufactured together with the fuselage frame and the main deck cross member to form an integral component before being arranged on the installation apparatus.

14. The method according to claim 12, wherein the main deck cross member is joined at its ends to the fuselage frame by side parts, which are produced separately and are inserted subsequently, with the free space located laterally outwards of the supporting elements.

15. The method according to claim 12, wherein the aircraft fuselage structure is assembled from the plurality of premanufactured integral units and longitudinal members, and wherein system lines are pre-installed in the free space located laterally outwards of the supporting elements.

16. The method according to claim 13, wherein the aircraft fuselage structure is assembled from the plurality of premanufactured integral units and from a plurality of premanufactured skin elements connected thereto, and wherein the plurality of premanufactured integral units are fitted into a premanufactured lower partial shell of the aircraft fuselage structure.

17. The method according to claim 12 wherein the plurality of premanufactured integral units are produced as a single piece or from a plurality of parts, and wherein the plurality of premanufactured integral units are produced from web regions situated in the plane of the integral unit and from chord regions connected thereto, and wherein the web regions are produced as a single piece with the chord regions, or wherein the chord regions are produced as a separate part in the form of a T-profile and are connected to the web regions.

18. The method according to claim 12, wherein the aircraft fuselage structure is assembled from fuselage sections, each of which comprises a plurality of premanufactured integral units.

* * * * *